(12) United States Patent
Holverson et al.

(10) Patent No.: US 10,974,337 B2
(45) Date of Patent: Apr. 13, 2021

(54) ADDITIVE MANUFACTURING SYSTEMS AND METHODS

(71) Applicant: ILLINOIS TOOL WORKS INC., Glenview, IL (US)

(72) Inventors: Todd Earl Holverson, Appleton, WI (US); Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 209 days.

(21) Appl. No.: 15/219,003

(22) Filed: Jul. 25, 2016

(65) Prior Publication Data

US 2017/0050254 A1    Feb. 23, 2017

Related U.S. Application Data

(60) Provisional application No. 62/206,139, filed on Aug. 17, 2015.

(51) Int. Cl.
*B23K 9/04* (2006.01)
*B33Y 10/00* (2015.01)
(Continued)

(52) U.S. Cl.
CPC .............. *B23K 9/044* (2013.01); *B05B 7/228* (2013.01); *B22F 3/1055* (2013.01); *B22F 7/064* (2013.01);
(Continued)

(58) Field of Classification Search
CPC .......... B23K 9/04; B23K 9/042; B23K 9/044; B23K 9/30; B23K 10/027; B23K 11/0013;
(Continued)

(56) References Cited

U.S. PATENT DOCUMENTS

| 2,191,471 A | 2/1940 | Hopkins |
| 3,141,085 A | 7/1964 | Manz |

(Continued)

FOREIGN PATENT DOCUMENTS

| CA | 2560290 | 11/2013 |
| CN | 1053760 | 8/1991 |

(Continued)

OTHER PUBLICATIONS

Kapustka, Nick, "Achieving Higher Productivity Rates Using Reciprocating Wire Feed Gas Metal Arc Welding," Welding Journal, Apr. 2015, pp. 70-74.
"Tattoo Machine", http://en.wikipedia.org/wiki/Tattoo_machine [accessed Apr. 7, 2017].
International Search Report from PCT application No. PCT/US2014/046568, dated Dec. 5, 2014, 12 pgs.
(Continued)

*Primary Examiner* — Erin E McGrath
(74) *Attorney, Agent, or Firm* — McAndrews, Held & Malloy, Ltd.

(57) ABSTRACT

Present embodiments include an additive manufacturing tool configured to receive a metallic anchoring material and to supply a plurality of droplets to a part, wherein each droplet of the plurality of droplets comprises the metallic anchoring material and a mechanical oscillation system configured to mechanically oscillate a structural component of the additive manufacturing tool toward and away from the part, wherein the mechanical oscillation system comprises a motor, a cam coupled to the motor, and a piston coupled to the cam, wherein the piston is fixedly attached to the structural component.

13 Claims, 4 Drawing Sheets

(51) Int. Cl.

| | | |
|---|---|---|
| B23K 9/23 | (2006.01) | |
| B22F 3/105 | (2006.01) | |
| B23K 9/02 | (2006.01) | |
| B29C 64/112 | (2017.01) | |
| B05B 7/22 | (2006.01) | |
| B22F 7/06 | (2006.01) | |
| B33Y 30/00 | (2015.01) | |
| B33Y 70/00 | (2020.01) | |
| B23K 9/095 | (2006.01) | |
| B23K 9/127 | (2006.01) | |
| B23K 9/173 | (2006.01) | |
| B23K 103/04 | (2006.01) | |
| B23K 103/24 | (2006.01) | |
| B23K 103/18 | (2006.01) | |
| B23K 103/20 | (2006.01) | |
| B23K 103/02 | (2006.01) | |

(52) U.S. Cl.
CPC .............. *B23K 9/02* (2013.01); *B23K 9/04* (2013.01); *B23K 9/0953* (2013.01); *B23K 9/1278* (2013.01); *B23K 9/173* (2013.01); *B23K 9/23* (2013.01); *B29C 64/112* (2017.08); *B33Y 10/00* (2014.12); *B33Y 30/00* (2014.12); *B33Y 70/00* (2014.12); *B23K 2103/02* (2018.08); *B23K 2103/05* (2018.08); *B23K 2103/18* (2018.08); *B23K 2103/20* (2018.08); *B23K 2103/24* (2018.08); *Y02P 10/25* (2015.11)

(58) Field of Classification Search
CPC ............ B23K 15/0086; B23K 26/0086; B23K 26/0869; B29C 64/112
USPC ...... 219/76.1, 11, 12, 13, 14, 16, 17, 125.12
See application file for complete search history.

(56) References Cited

U.S. PATENT DOCUMENTS

| | | | |
|---|---|---|---|
| 3,581,053 A | 5/1971 | Manz | |
| 3,912,980 A | 10/1975 | Crump | |
| 4,365,137 A * | 12/1982 | Tarasov | B23K 9/09 219/125.1 |
| 4,595,820 A | 6/1986 | Richardson | |
| 4,665,299 A | 5/1987 | Iwata | |
| 4,723,060 A | 2/1988 | Arnoldy | |
| 4,758,707 A | 7/1988 | Ogilvie | |
| 4,782,206 A * | 11/1988 | Ayres | B23K 9/048 219/137 R |
| 4,889,969 A | 12/1989 | Kawai | |
| 4,897,523 A | 1/1990 | Parks | |
| 5,148,001 A | 9/1992 | Stava | |
| 5,233,150 A * | 8/1993 | Schneebeli | B23K 9/044 219/76.14 |
| 5,281,789 A | 1/1994 | Merz | |
| 5,542,049 A * | 7/1996 | Kurokawa | G05B 19/054 219/130.1 |
| 5,697,901 A * | 12/1997 | Eriksson | A61K 9/0021 514/44 R |
| 6,023,046 A | 2/2000 | Holverson | |
| 6,051,810 A | 4/2000 | Stava | |
| 6,248,976 B1 | 6/2001 | Blankenship | |
| 6,265,701 B1 | 7/2001 | Bickel | |
| 6,326,591 B1 | 12/2001 | Hutchinson | |
| 6,329,636 B1 | 12/2001 | Geissler | |
| 6,331,694 B1 | 12/2001 | Blankenship | |
| 6,405,095 B1 | 6/2002 | Jang | |
| 6,441,342 B1 | 8/2002 | Hsu | |
| 6,498,321 B1 | 12/2002 | Fulmer | |
| 6,515,259 B1 | 2/2003 | Hsu | |
| 6,534,745 B1 | 3/2003 | Lowney | |
| 6,707,001 B1 | 3/2004 | Ulrich | |
| 6,800,832 B2 | 10/2004 | Hutchison | |
| 6,909,067 B2 | 6/2005 | Davidson | |
| 6,933,466 B2 | 8/2005 | Hutchison | |
| 6,963,048 B2 | 11/2005 | Huismann | |
| 6,969,823 B2 | 11/2005 | Huismann | |
| 6,974,931 B2 | 12/2005 | Holverson | |
| 6,984,806 B2 | 1/2006 | Huismann | |
| 7,129,443 B2 | 10/2006 | Davidson | |
| 7,165,707 B2 | 1/2007 | Huismann | |
| 7,304,269 B2 | 12/2007 | Fulmer | |
| 7,335,854 B2 | 2/2008 | Hutchison | |
| 8,373,094 B2 | 2/2013 | Wells | |
| 8,522,647 B1 | 9/2013 | Dixon | |
| 8,598,492 B2 | 12/2013 | Davidson | |
| 8,704,131 B2 | 4/2014 | Davidson | |
| 8,803,034 B2 | 8/2014 | Peters | |
| 8,901,453 B2 | 12/2014 | Miyagi | |
| 9,174,294 B2 | 11/2015 | Hutchison | |
| 9,314,865 B2 * | 4/2016 | Davidson | |
| 2001/0009252 A1 * | 7/2001 | Hiraoka | B23K 9/173 219/125.12 |
| 2001/0040153 A1 | 11/2001 | Lanouette | |
| 2002/0092376 A1 | 7/2002 | Nozawa | |
| 2003/0021251 A1 | 1/2003 | Moshiri-Tafreshi | |
| 2003/0058149 A1 | 3/2003 | Jayadeva | |
| 2003/0062355 A1 | 4/2003 | Ikegami | |
| 2003/0068518 A1 | 4/2003 | Ando | |
| 2003/0201251 A1 | 10/2003 | Barbezat | |
| 2004/0234687 A1 | 11/2004 | Schmid | |
| 2005/0284599 A1 | 12/2005 | Grinberg | |
| 2006/0054079 A1 | 3/2006 | Withey | |
| 2006/0226137 A1 | 10/2006 | Huismann | |
| 2007/0000893 A1 | 1/2007 | Huismann | |
| 2007/0051711 A1 | 3/2007 | Kachline | |
| 2007/0102407 A1 | 5/2007 | Uezono | |
| 2007/0181547 A1 | 8/2007 | Vogel | |
| 2008/0087359 A1 | 4/2008 | Zurecki | |
| 2008/0217314 A1 | 9/2008 | Wells | |
| 2008/0264917 A1 | 10/2008 | White | |
| 2009/0078689 A1 | 3/2009 | Brass | |
| 2009/0173726 A1 | 7/2009 | Davidson | |
| 2009/0242533 A1 | 10/2009 | Yamazaki | |
| 2009/0304943 A1 | 12/2009 | Gollob | |
| 2010/0176104 A1 | 7/2010 | Peters | |
| 2011/0108527 A1 | 5/2011 | Peters | |
| 2011/0204034 A1 | 8/2011 | Schartner | |
| 2011/0220619 A1 * | 9/2011 | Mehn | B23K 9/0953 219/108 |
| 2011/0288575 A1 | 11/2011 | Colton | |
| 2012/0067859 A1 | 3/2012 | Albrecht | |
| 2012/0097655 A1 | 4/2012 | Daniel | |
| 2012/0143491 A1 | 6/2012 | Cheng | |
| 2012/0209307 A1 | 8/2012 | Snijders | |
| 2012/0298642 A1 | 11/2012 | Lambert | |
| 2012/0325779 A1 | 12/2012 | Yelistratov | |
| 2013/0153557 A1 | 6/2013 | Pagano | |
| 2013/0309420 A1 | 11/2013 | Flesch | |
| 2014/0021183 A1 | 1/2014 | Peters | |
| 2014/0251971 A1 | 9/2014 | Hearn | |
| 2014/0263237 A1 | 9/2014 | Daniel | |
| 2014/0263241 A1 | 9/2014 | Henry | |
| 2015/0021379 A1 | 1/2015 | Albrecht | |
| 2015/0021815 A1 | 1/2015 | Albrecht | |
| 2015/0076119 A1 | 3/2015 | Hsu | |
| 2015/0105898 A1 | 4/2015 | Adams | |
| 2016/0059342 A1 | 3/2016 | Plasch | |
| 2016/0267806 A1 | 9/2016 | Hsu | |
| 2016/0288235 A1 | 10/2016 | Davidson | |
| 2017/0072499 A1 | 3/2017 | Schartner | |

FOREIGN PATENT DOCUMENTS

| | | |
|---|---|---|
| CN | 2125475 | 12/1992 |
| CN | 1593829 | 3/2005 |
| CN | 1597193 | 3/2005 |
| CN | 101185986 | 5/2008 |
| CN | 101491856 | 7/2009 |
| CN | 201644997 | 11/2010 |
| CN | 102791414 | 11/2012 |

(56) References Cited

FOREIGN PATENT DOCUMENTS

| CN | 103056367 | 4/2013 |
|---|---|---|
| CN | 104043830 | 9/2014 |
| CN | 104760290 | 7/2015 |
| DE | 102013217317 | 3/2015 |
| EP | 1080818 | 3/2001 |
| EP | 2013056280 | 4/2013 |
| EP | 2644306 | 10/2013 |
| EP | 2781291 | 10/2015 |
| EP | 2929972 | 10/2015 |
| EP | 3132877 | 2/2017 |
| EP | 3165314 | 5/2017 |
| EP | 2017077132 | 5/2017 |
| JP | H04127970 | 4/1992 |
| JP | H07252630 | 10/1995 |
| JP | 2001138059 | 5/2001 |
| JP | 2003010970 | 1/2003 |
| WO | 2012121086 | 9/2012 |

OTHER PUBLICATIONS

International Search Report from PCT application No. PCT/US2014/046769, dated Dec. 5, 2014, 11 pgs.
International Search Report from PCT application No. PCT/US2016/061381, dated Jan. 24, 2017.
Painful Pleasures, Help Center, "Coil vs. Rotary Tattoo Machines", http://info.painfulpleasures.com/help-center/information-center/coil-vs-rotary-tattoo-machines [accessed Apr. 7, 2017].
"Evaluation of the Tip Tig Welding System, a Semi-automatic Hot Wire GTAW Process, Compared to Manual GTAW: Final Report," National Shipbuilding Research Program, Newport News Shipbuilding, a Division of Hungtington Ingalls Industries, Aug. 13, 2013.
"The Total Benefits from Tip Tig," The Evolution of Tig brochure, Tip Tig USA [last accessed Aug. 10, 2017].
"Tip Tig Your, Welding Solution," Tip Tig International AG (Switzerland) Sales and Business Development [last accessed Aug. 10, 2017].
Int'l Search Report and Written Opinion Appln No. PCT/US2018/053760 dated Mar. 7, 2019 (13 pgs.).

\* cited by examiner

ADDITIVE MANUFACTURING SYSTEMS AND METHODS

CROSS REFERENCE TO RELATED APPLICATIONS

This application is a Non-provisional U.S. Patent Application of U.S. Provisional Application No. 62/206,139, entitled "Additive Manufacturing Systems and Methods," filed Aug. 17, 2015, which is hereby incorporated by reference in its entirety for all purposes.

BACKGROUND

The present disclosure relates generally to additive manufacturing, and more particularly, to systems and methods for additive manufacturing for joining different materials.

Various manufactured products may incorporate components with different materials. As may be appreciated, the different materials of the manufactured products may be joined together by fasteners, mating geometries, welding, or other processes. Fasteners or complementary geometries may add components or weight to the joint. Three dimensional additive manufacturing with metals can be useful for creating durable components in a controlled and precise manner. Unfortunately, such processes can be complicated and expensive.

BRIEF DESCRIPTION

In one embodiment, an additive manufacturing system includes an additive manufacturing tool configured to receive a metallic anchoring material and to supply the welding wire to a workpiece, and a mechanical oscillation system configured to mechanically oscillate a structural component of the welding tool toward and away from the workpiece, and wherein the mechanical oscillation system comprises a motor and a mechanical linkage assembly coupled to the motor, wherein the mechanical linkage assembly is fixedly attached to the structural component.

In another embodiment, a system includes a welding tool configured to receive a welding wire and to supply a plurality of droplets to a part, wherein each droplet of the plurality of droplets comprises the metallic anchoring material and a mechanical oscillation system configured to mechanically oscillate a structural component of the additive manufacturing tool toward and away from the part, wherein the mechanical oscillation system comprises a motor, and a mechanical linkage assembly, wherein the mechanical linkage assembly is fixedly attached to the structural component.

In another embodiment, a method includes securing a liner configured to receive a welding wire to the structural component, oscillating the structural component towards and away from a workpiece, and depositing a portion of the welding wire on the workpiece.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
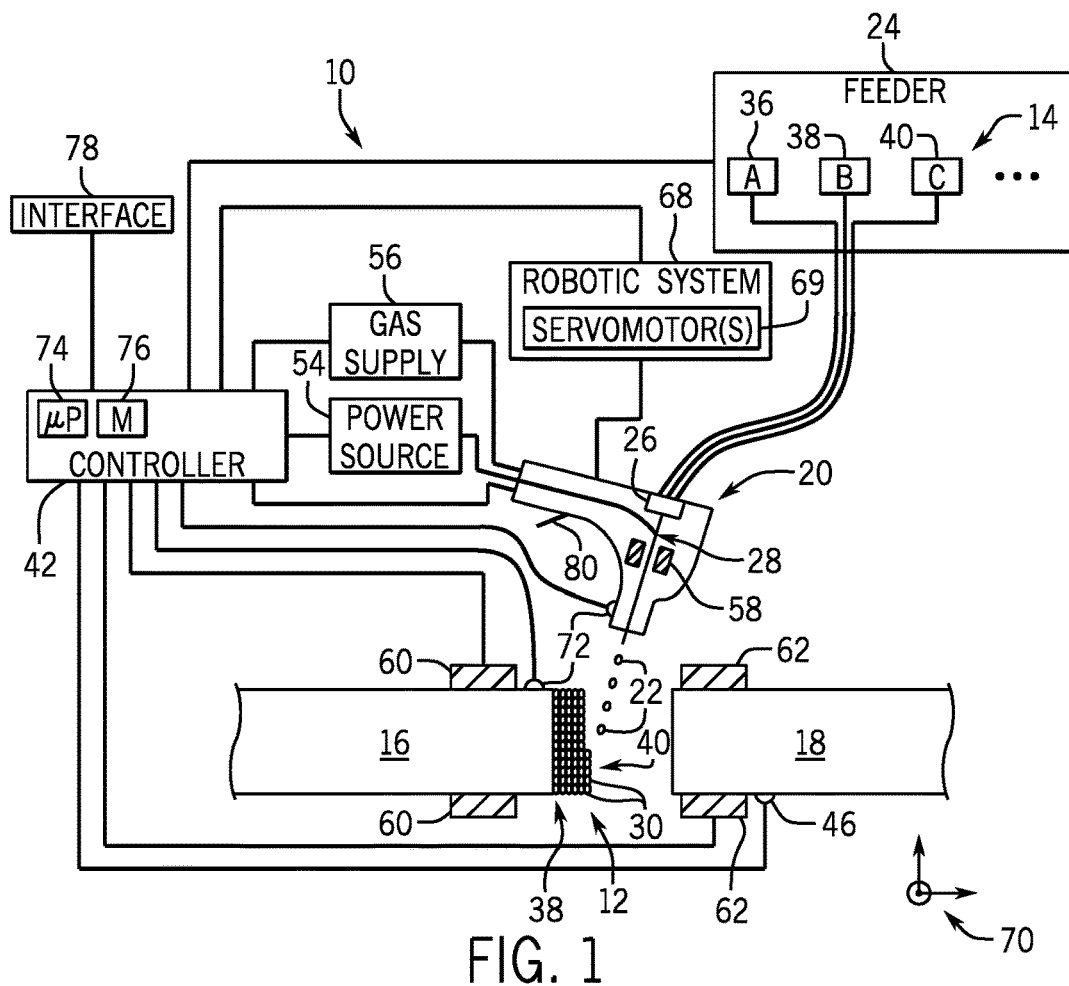
FIG. 1 is a diagram of an embodiment of an additive manufacturing system and a part.

Turning to FIG. 1, an embodiment of an additive manufacturing system 10 (e.g., a welding system) that additively forms (e.g., prints, builds) a part 12 from one or more anchoring materials 14. The additively formed part 12 may be a first work piece 16, a second work piece 18, or a joint between the first work piece 16 and the second work piece 18, or any combination thereof. In some embodiments, the first and second work pieces 16, 18 may be of different materials having significantly different physical properties. For example, in one embodiment, the first work piece 16 may be aluminum and the second work piece 18 may be steel. An additive manufacturing tool 20 (e.g., a welding tool) deposits multiple droplets 22 to form (e.g., print, build) the part 12 of the one or more anchoring materials 14. In some embodiments, the additive manufacturing tool 20 deposits the droplets 22 between the first and second work pieces 16, 18. As described in detail below, the additive manufacturing tool 20 may utilize one or more types of energy to form and deposit the droplets 22 to form the part 12. The one or more types of energy utilized by the additive manufacturing tool 20 may include, but are not limited to, an electric power output, photonic energy (e.g., laser), or any combination thereof. Where the part 12 is a joint between the first and second work pieces 16, 18, the additive manufacturing tool 20 utilizes the energy to join the first and second work pieces 16, 18 via the part 12.

Figure 2:
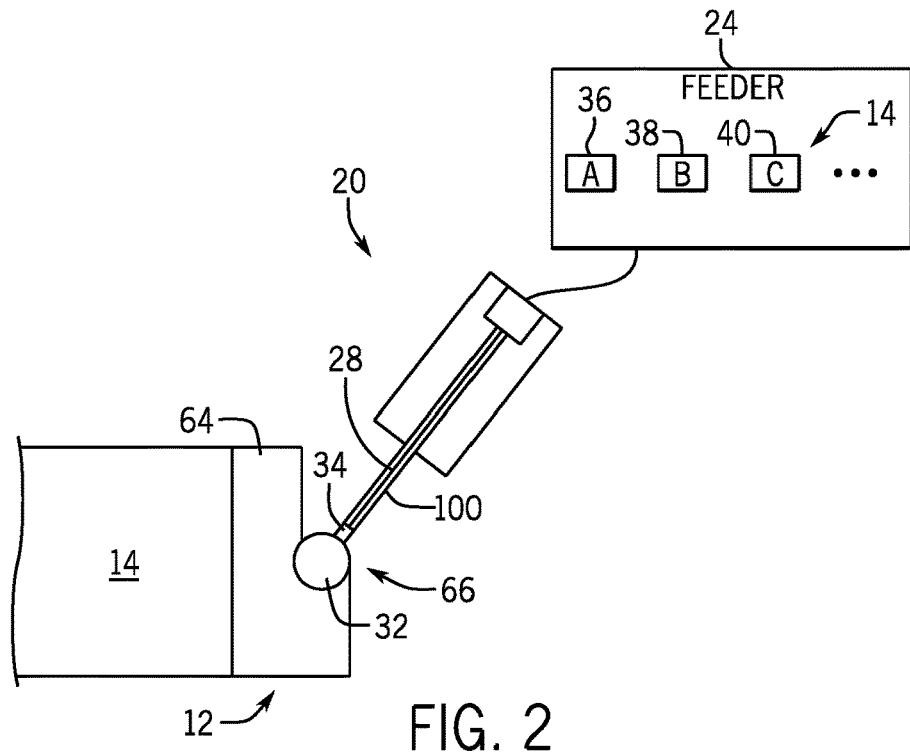
FIG. 2 is a diagram of an embodiment of the additive manufacturing system and a part.

The additive manufacturing tool 20 heats the one or more anchor materials 14 from a feeder 24 to form the droplets 22 having a desired composition. In some embodiments, a mixer 26 of the additive manufacturing tool 20 is configured to receive and to combine the one or more anchor materials 14 from the feeder 24. For example, the mixer 26 may combine the multiple anchor materials 14 into an electrode 28 having a desired combination of the anchor materials 14. In some embodiments, the mixer 26 may form a powder mixture of the multiple anchor materials 14. The electrode 28 and/or the powder mixture may be formed into droplets 22. The one or more anchor materials 14 are metallic materials that include, but are not limited, to aluminum alloys, steel alloys, aluminum, iron, copper, manganese, silicon, magnesium, zinc, chromium, titanium, molybdenum, and nickel. As discussed herein, the droplets 22 are units of material transfer. Each droplet 22 may become a "micro-deposit" when solidified, and the part 12 is formed from multiple micro-deposits 30. FIG. 2 illustrates an embodiment of the additive manufacturing tool 20 that directs the anchor material 14 (e.g., electrode 28) into a molten puddle 32 of micro-deposits 30 to form the part 12. The anchor material 14 may be at approximately ambient temperature or a preheated temperature when inserted into the puddle 32. A portion 34 (e.g., ball) of the anchor material 14 is melted by the puddle 32, thereby forming a micro-deposit 30 of the part 12 without forming a defined droplet 22. For example, the preheated portion 34 of the anchor material 14 may join the puddle 32, thereby forming the micro-deposit 30 of the part 12 via a hot-wire welding process. As may be appreciated, the puddle 32 may be a recently formed section of the part 12 that has not yet solidified. The energy applied to the puddle 32 melt the portion 34 may include, but is not limited, to resistance heating, photonic (laser) energy, plasma, or inductive heating.

Returning to FIG. 1, the one or more anchor materials 14 may include, but are not limited to, powders, solid wires, cored wires, tubular wires, or coated wires, or any combination thereof. In some embodiments, a first anchor material 36 may be substantially the material of the first work piece 16, and a second anchor material 38 may be substantially the material of the second work piece 18. In other words, the first and second anchor materials 36, 38 may have chemical compositions that are substantially similar or compatible to the respective first and second work pieces 16, 18. For example, the first anchor material 36 may have only minor differences (e.g., elemental components varying by only fractions of compositional percentages, different alloys from the same alloy family) relative to the material of the first work piece 16. In some embodiments, anchoring materials 14 may include, but are not limited to, brazing or soldering materials with lower melting temperatures than the materials of the first work piece 16 and/or the second work piece 18. Anchor materials 14 with a lower melting temperature than the first or second work pieces 16, 18 may enable layers of micro-deposits 30 adjacent to the first or second materials 16, 18 to not melt when the one or more anchoring materials 14 is applied. Some embodiments of the additive manufacturing system 10 may include more than two anchoring materials 14, such as 3, 4, 5, 6, 7, 8, 9, 10, or more anchoring materials 14. For example, a third anchor material 40 may be supplied to the additive manufacturing tool 20. The third anchor material 40 may have a chemical composition that is substantially similar to the material of the first work piece 16 or to the material of the second work piece 18. Additionally, or in the alternative, the third anchor material 40 may have a chemical composition that is an alloying material that provides a desired property (e.g., adhesion, increased or decreased fluidity) between the first and second anchoring materials 36, 38, and/or the chemical composition of the third anchor material 40 may provide a desired property (e.g., strength, hardness, galvanic protection) to the part 12.

A controller 42 of the additive manufacturing system 10 controls the application of the droplets 22 to form the part (e.g., anchor) 12 from the micro-deposits 30. In certain embodiments, the controller 42 may be a single control system with a single controller, or the controller 42 may include multiple control systems or controllers. For example, multiple control systems of the controller 42 may be configured to regulate different component or systems of the additive manufacturing system 10 and/or the multiple control systems may be responsive to a single, central controller of the controller 42. In some embodiments with wired anchor materials 14 (e.g., welding wires), the controller 42 controls the composition of the droplets 22 applied to the part 12 by adjusting the relative quantities of the one or more anchor materials 14 supplied to the mixer 26 of the additive manufacturing tool 20, which thereby forms the electrode 28. For example, where the first anchor material 36 is substantially similar to or compatible with the material of the first work piece, the controller 42 may increase the relative ratio of the first anchor material 36 in the electrode 28 to form (e.g., print) portions of the part 12 near the first work piece 16. As discussed herein, the composition of each droplet 22 is based on the one or more anchor materials 14 that make up the respective droplet 22. The droplets 22 are liquid (e.g., molten) at least in part. In some embodiments, a droplet 22 may be a liquid anchor material 14 encapsulating a solid element of the same or a different anchor material 14. For example, the additive manufacturing tool 20 may at least partially melt only an outer layer of a droplet 22.

The additive manufacturing tool 20 may mix (e.g., melts, sinters, compresses) multiple anchor materials 14 with the mixer 26 into an electrode 28 with a mixed composition. The controller 42 may control the additive manufacturing tool 20 to form droplets 22 with the mixed composition from the mixed electrode 28. The controller 42 may adjust the composition of the part (e.g., anchor) 12 by varying ratios of the one or more anchor materials 14 in the mixed electrode 28. In some embodiments, the additive manufacturing tool 20 supplies each of the one or more anchor materials 14 as a separate electrode 28 that the additive manufacturing tool 20 respectively forms into droplets 22. For example, the controller 42 may control the additive manufacturing tool 20 to form separate droplets 22 with different respective compositions from each of the multiple electrodes 28. The controller 42 may adjust the composition of the part 12 by varying ratios of the one or more anchor materials 14 applied as droplets 22 to the part 12.

Figure 3:
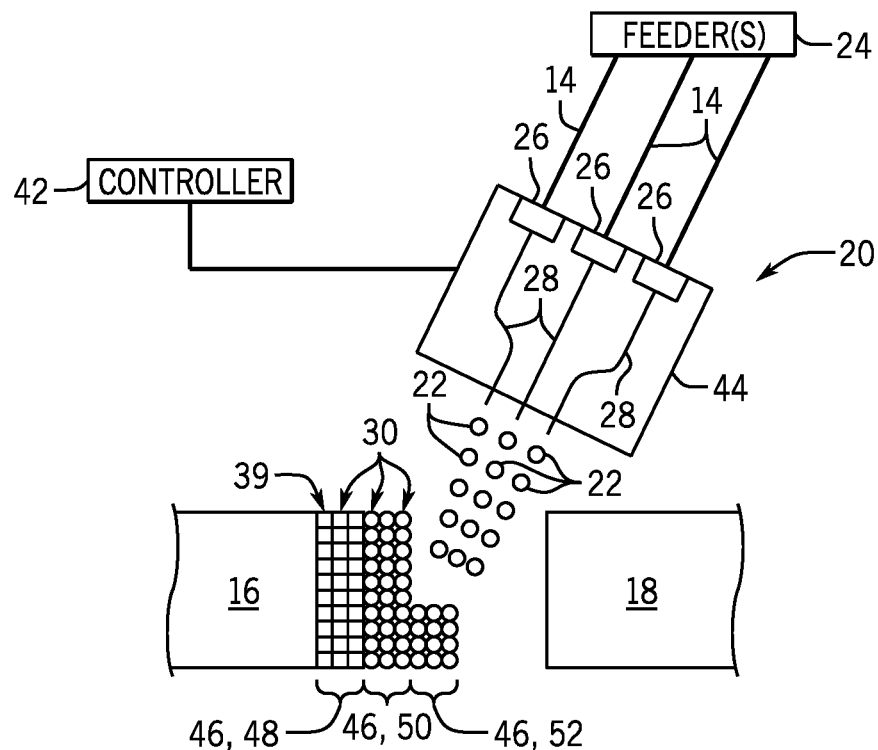
FIG. 3 is a diagram of an embodiment of the additive manufacturing system with an integrated tool head.

In some embodiments, the controller 42 is coupled to multiple additive manufacturing tools 20, each supplying a separate anchor material 14 via a respective electrode. The controller 42 may control each of the multiple additive manufacturing tools 20 to adjust the composition of the part 12 by varying ratios of the anchor materials 14 supplied as droplets 22 by each additive manufacturing tool 20. As illustrated in FIG. 3, multiple wire delivery systems (e.g., feeders 24) may be combined an integrated tool head 44 of the manufacturing tool to supply multiple anchor materials 14 in rows or a grid. The integrated tool head 44 may increase the deposition rate of the anchor materials 14 to form (e.g., print, build up) the part 12. The integrated tool head 44 of the additive manufacturing tool 20 may have multiple mixers 26 to receive and process the anchor materials 14 into electrodes 28 and/or powder streams. The controller 42 may control each mixer 26 so that each electrode 28 and/or powder stream has the same composition. In some embodiments, the controller 42 controls one or more mixers 26 so that the respective electrode 28 or powder stream has a different composition than the electrode 28 or powder stream from another mixer 26. The integrated tool head 44 may enable the additive manufacturing tool 20 to form multiple layers 46 of the part at approximately the same time, thereby enabling a reduction of production time for the part 12 by reducing a quantity of passes of the additive manufacturing tool 20 to form the part 12. A first layer 48 of the part 12 formed of substantially solidified micro-deposits 30 is illustrated with a grid 39. The micro-deposits 30 of a second layer 50 of the part 12 formed between the first layer 48 and a third layer 52 may be hotter than the micro-deposits 30 of the first layer 48, yet sufficiently solidified to support and bond with the deposited droplets 22 of the third layer 52. The controller 42 controls the deposition rate of the droplets 22 and the rate of formation of the layers 46 by the additive manufacturing tool 20 to enable each layer to bond with the previously formed layer 46. For example, the controller 42 may decrease the deposition rate or rate of layer formation as the additive manufacturing tool 20 builds up the part 12.

Returning again to FIG. 1, the controller 42 controls a power source 54 (e.g., a current-regulated power source) to adjust the power output (e.g., current output, voltage output, photonic energy) provided to the additive manufacturing tool 20 to melt the one or more anchor materials 14 into the droplets 22. As may be appreciated, the power source 54 may include, but is not limited to, an engine-driven generator, a welding power supply, an inverter, laser, or any combination thereof. In embodiments where the power source 54 is a welding power supply, the controller 42 may regulate operation (e.g., voltage level and/or current level of output power) of the power source 54 based on a state of an operation, such as a welding operation. For example, the controller 42 may regulate operation of the power source 54 based on the welding operation being in an arc state or a short state.

The controller 42 may control the power source 54 to provide a DC or AC power output to the electrode 28 in a controlled waveform, similar to a pulsed welding process or a short circuit welding process (e.g., regulated metal deposition (RMD™)). In some embodiments, the controller 42 controls the power source 54 and/or the feeder 24 to provide power output to the electrode 28 via the additive manufacturing tool 20 to enable a modified short circuit welding process (e.g., controlled short circuit) to form the part 12. Additionally, the controller 42 facilitates formation of the part 12 by controlling the additive manufacturing tool 20 to extend and retract the one or more electrodes 28 during a controlled short circuit welding process. The power output provided to the additive manufacturing tool 20 melts the electrode 28 into the droplets 22, which are deposited via the arc to the part 12 as micro-deposits 30. That is, in some embodiments, the electrode 28 is a welding wire, the additive manufacturing tool 20 is a welding torch (e.g., a welding tool) configured for a pulsed welding process or a short circuit welding process, and the feeder 24 is a welding wire feeder. The welding torch may layer micro-deposits 30 via the arc, thereby forming (e.g., building up, printing) the part 12 from welding wire via a pulsed welding process and/or a short circuit welding process (e.g., RMD). As may be appreciated, some embodiments of the additive manufacturing system 10 may include a gas supply 56 configured to provide one or more shielding gases to the additive manufacturing tool 20. The one or more shielding gases may include, but are not limited to, argon, carbon dioxide, helium, nitrogen, hydrogen, and combinations thereof. The system may be configured to include a flux delivery system configured to provide one or more fluxes. These fluxes are of different compositions to provide different end results, in particular, metallurgical results.

As discussed above, the controller 42 may control power output for processes utilizing electrical arc and/or photonic energy to heat the electrode 28. The controller 42 may control the rate at which the droplets 22 are applied to the part 12 by controlling the power source 54. In some embodiments, the controller 42 controls a heating device 58 (e.g., inductor coil, resistive heater) to preheat the electrode 28. Accordingly, the controller 42 may control the heat applied to the electrode 28 to form the droplets 22. Additionally, or in the alternative, the heating devices 58, 60, 62 may enable pre-heating or post-heating of the electrode 28, the first work piece 16, and/or the second work piece 18 respectively. Preheating the electrode 28 may reduce the heat applied to the first and second work pieces 16, 18, thereby reducing the formation of a heat affected zone.

The droplets 22 added to the part 12 as micro-deposits 30 affect the heat added to the first work piece 16 and the second work piece 18. The formation of the micro-deposits 30 may include, but is not limited to, heating the anchor material 14 (e.g., electrode 28) to form the droplet 22, and cooling the micro-deposit 30 in the part 12. As may be appreciated, the heat of the droplet 22 and the cooling rate of the micro-deposit may affect the microstructure of the micro-deposit 30 formed by the respective droplet 22, thereby affecting the properties of the part 12. For example, the microstructure of the micro-deposits 30 of the part 12 at a first location 64 may be different than the microstructure of the micro-deposits 30 at a second location 66. Additionally, as discussed herein, the application of each droplet 22 to the part 12 may include, but is not limited to, the application rate of droplets 22 to the part 12 and the application location on the part 12 of each micro-deposit 30. The controller 42 may control the temperature of the droplets 22, the application (e.g., deposition) rate, and the application location of each droplet 22 to control the heat applied to the work pieces 16, 18. For example, the controller 42 may reduce the inducement of a heat affected zone (HAZ) that may affect the microstructure and properties (e.g., strength, fatigue life) of the work pieces 16, 18 proximate to the part 12. The temperature, deposition rate, and application location of the droplets 22 in the part 12 affects the heat added to the first work piece 16 and the second work piece 18. For example, an arc at 2000° C. adds more heat to the part 12 than an arc at 1200° C. As may be appreciated, high deposition rates (e.g., 60 Hz) of droplets 22 may add less heat to the part 12 than relatively lower deposition rates (e.g., 30 Hz) of droplets 22. Additionally, droplets 22 applied at the first location 64 on the first work piece 16 add more heat to the first work piece 16 than droplets 22 applied at the second location 66 on the first work piece 16. In some embodiments, the controller 42 controls the heating device 58 to affect the application temperature of the micro-deposits 30 in the part 12 to affect the heat added to the first work piece 16 and the second work piece 18. The controller 42 may control the feeder 24 and/or the mixer 26 to control the application rate, and the controller 42 may control the power source 54 to control the application rate and the application temperature of the droplets 22 as the micro-deposits in the part 12. In some embodiments, a robotic system 68 coupled to the additive manufacturing tool 20 may control the application location of the droplets 22 by moving the additive manufacturing tool 20 along coordinate axes 70 via one or more servomotors 69.

In a similar manner to controlling the heat applied to the work pieces 16, 18, the controller 42 may control the temperature of the droplets 22, the application rate, and the application location of each droplet 22 to control the heat applied to previously applied micro-deposits 30. For example, the application rate and the temperature of the droplets 22 may affect the cooling rate and microstructure of previously applied micro-deposits 30. The controller 42 may control the application rate and the temperature of the droplets 22 to achieve a desired microstructure for each of the micro-deposits 30 utilized to form the part 12. Accordingly, the controller may control the composition and/or the microstructure of the micro-deposits 30 of the part 12.

In some embodiments, a first heating device 60 may heat the first work piece 16 near the part 12, and/or a second heating device 62 may heat the second work piece 18 near the part 12 (e.g., joint). The first and second heating devices 60, 62 may include, but are not limited to, inductor coils, resistance heaters, flames, and so forth. The first and second heating devices 60, 62 may interface with one or more surfaces of the respective first and second work pieces 16, 18. For example, the first heating device 60 may extend around the first work piece 16. The controller 42 may control the first heating device 60 and/or the second heating device 62 to preheat the respective work pieces 16, 18 near the part 12. As may be appreciated, preheating a work piece 16, 18 may affect the adhesion to micro-deposits 30 from the additive manufacturing tool 20. For example, increasing the temperature of the first work piece 16 may increase the adhesion of the micro-deposits 30 at the first location 64. In some embodiments, the controller 42 independently controls the first and second heating devices 60, 62, thereby enabling the first work piece 16 to be preheated to a different temperature than the second work piece 18.

As discussed previously, the first work piece 16 may be different from the second work piece 18. For example, the first work piece 16 may be aluminum and the second work piece 18 may be steel. In some embodiments, the first and second work pieces 16, 18 may be the same or different compositions with the same base metal (e.g., aluminum, titanium, iron, galvanized-coated material, high strength steel). For example, the first work piece 16 may be a nickel coated steel, and the second work piece 18 may be a relatively high-carbon steel. The first work piece 16 may have different properties and/or structure than the second work piece 18. For example, the melting temperature, thermal conductivity, and strength, among other properties, may differ between the first work piece 16 and the second work piece 18. Additionally, or in the alternative, the first work piece 16 and the second work piece 18 may have different sensitivities to heat. For example, the first work piece 16 may be annealed at a melting temperature of the second work piece 18. Accordingly, annealing the first work piece 16 (e.g., by heating it to the melting temperature of the second work piece 18) may affect properties (e.g., strength, fatigue-life) of the first work piece 16.

As may be appreciated, the heat affected zone (HAZ) of a metal may be defined herein as the area of the metal in which the properties and/or microstructure of the metal has been affected by heat. In some embodiments, the controller 42 may independently control the heat applied to the electrode 28, the heat applied to the first work piece 16 (e.g., via the first heating device 60), and the heat applied to the second work piece 18 (e.g., via the second heating device 62). Through independent control of the heat applied to these components, the additive manufacturing system 10 may reduce the HAZ of the first work piece 16 and/or the second work piece 18. For example, if the first work piece 16 is aluminum and the second work piece 18 is a steel with a higher melting temperature than the first work piece 16, the controller 42 may control the additive manufacturing tool 20 to apply the droplets 22 near the second work piece 18 (e.g., steel) with more heat and/or at a higher rate than the droplets 22 near the first work piece 16 (e.g., aluminum).

The controller 42 may control the composition and the formation of each of the droplets 22 applied to build the part 12 with micro-deposits 30 as the additive manufacturing tool 20 moves between the first work piece 16 and the second work piece 18. In this way, the additive manufacturing system 10 may control the composition and structure (e.g., spatial distribution of the micro-deposits 30) of the part 12 to have a desired set of properties while controlling the HAZ of the first and/or second work pieces 16, 18. Sensors 72 may measure the temperature and cooling rate of the electrode 28, the first work piece 16, and/or the second work piece 18. Feedback from the sensors 46 may be stored as temperature history of the electrode 28, the first work piece 16, and/or the second work piece 18. The controller 42 may use this temperature history to control the composition and structure of the part 12. In some embodiments, the sensors 72 may measure the position of the additive manufacturing tool 20, first work piece 16, and second work piece 18 relative to the set of coordinate axes 70. The controller 42 may control the application of the droplets 22 to the part 12 based at least in part on the relative distance from the first work piece 16 and/or the second work piece 18. For example, in some applications the part 12 may be formed to have a gradient composition of the first and second anchor materials 36, 38, such that the composition of the part 12 adjacent to the first work piece 16 is compatible (e.g., forming a strong bond) with the first work piece 16, and the composition of the part 12 adjacent to the second work piece 18 is compatible (e.g., forming a strong bond) with the second work piece 18.

The controller 42 may independently control the thermal cycle, peak temperature, and cooling rates of each of the micro-deposits 30 based at least in part on the application location in the part 12. The controller 42 may independently control the composition and the formation of each of the droplets 22 for the application location according to a set of instructions (e.g., code) executed by a processor 74. The processor 74 may load the set of instructions from a memory 76 based at least in part on the work pieces 16, 18 and the anchor materials 14. In some embodiments, an operator (e.g., host computer) may provide the set of instructions directly to the controller 42 via an operator interface 78. For example, the operator may load a set of instructions for forming the part 12 from a three-dimensional model (e.g., computer aided design (CAD) model) of the anchor produced by a three-dimensional 3D CAD tool. In some embodiments, the controller 42 may receive and/or produce a set of instructions to produce the part 12 with a desired composition of anchor materials 14. For example, the controller 42 may utilize a 3D CAD model of the part 12 to control the robotic system 68 to produce the part 12 from the anchor materials 14. Additionally, or in the alternative, an operator may input information about the work pieces 16, 18 and the anchor materials 14 into the operator interface 78, and the controller 42 may determine and/or modify the set of instructions to form the part 12 with desired characteristics. The set of instructions directs the controller 42 to control the composition, formation, and application of each droplet 22 as a micro-deposit 30 to form the part 12 with desired characteristics.

The controller 42 may use input from the sensors 72 to individually control each droplet 22 applied to the part 12 as a micro-deposit 30. In some embodiments, the controller 42 may adapt the set of instructions based at least in part on the input from the sensors 72 to compensate for changes to the first work piece 16, the second work piece 18, or the part 12. For example, the controller 42 may adapt the application location and/or the heating of the droplets 22 during the formation of the part 12 if the input from the sensors 72 indicates a change in the fit-up of a joint between the first work piece 16 and the second work piece 18. Additionally, or in the alternative, the controller 42 may adapt the application and/or the heating of the droplets if the input from the sensors 46 indicates a deflection or burn through of the first work piece 16 and/or the second work piece 18. The controller 42 may adapt the temperature of the first work piece 16 and/or the temperature of the second work piece 18 (e.g., via the heating devices 60, 62) during the formation of the part 12 if the input from the sensors 72 indicates a deflection or burn through of the first work piece 16 and/or the second work piece 18.

The additive manufacturing system 10 may build the part 12 between the first work piece 16 and the second work piece 18 by manual or automatic movement of the additive manufacturing tool 20. In some embodiments, the droplets 22 may be deposited via the arc (e.g. spray) as shown in FIG. 1. In some embodiments as illustrated in FIG. 2, the electrode 28 contacts the work piece and/or part 12, and the additive manufacturing tool 20 applies the respective micro-deposits 30 via short circuit. In some embodiments, an operator begins or resumes building the part 12 by actuating a trigger 80. The controller 42 determines a location of the additive manufacturing tool 20 relative to the work pieces 16, 18 via the sensors 72, and the controller 42 determines the application location of the micro-deposits 30 prior to formation of the droplets 22 of the desired composition according to the set of instructions. In some embodiments, the robotic system 68 controls the movement of the additive manufacturing tool 20 along the coordinate axes 70, such as via servomotors 69. The controller 42 may control the robotic system 68 with the set of instructions to move the additive manufacturing tool 20 to apply the controlled droplets 22 as micro-deposits 30 to respective locations in the part 12 based on the set of instructions. The robotic system 68 thereby enables the controller 42 to automatically form parts 12 with a desired composition and geometry. In some embodiments, the robotic system 68 may form (e.g., print, build up) the parts 12 from the one or more anchor materials 14 separate from the work pieces 16, 18. The formed parts 12 may later be joined with the work pieces 16, 18.

Figure 4:
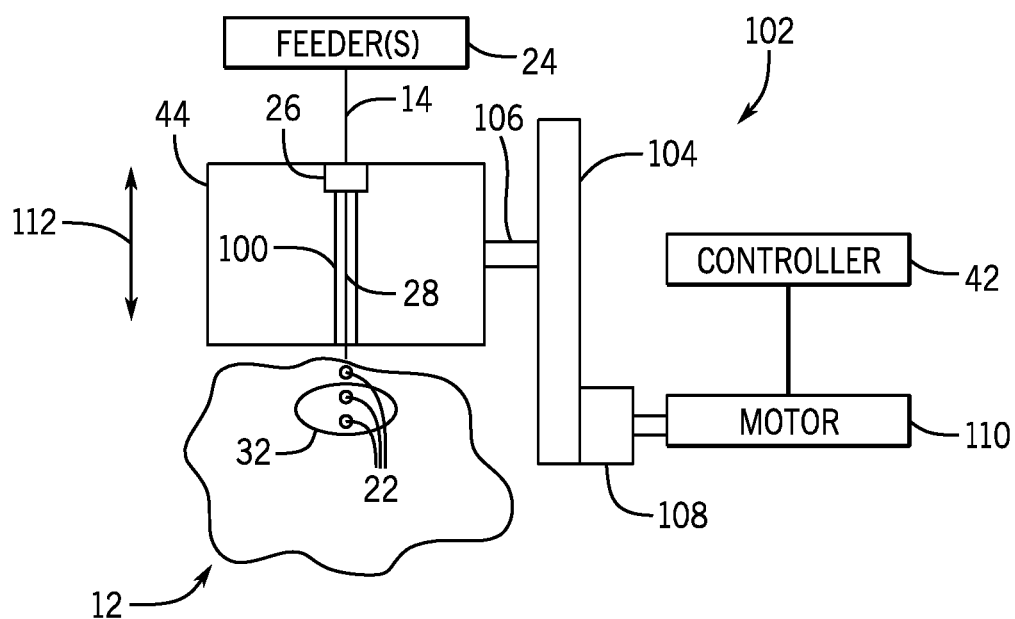
FIG. 4 is a schematic of a mechanical oscillation system of the additive manufacturing system.

In certain embodiments, the integrated tool head 44 of the manufacturing tool 20 may be configured to mechanically oscillate (i.e., move up and down away and towards the puddle 32) to further improve deposition of the droplets 22 onto the part 12. In other words, the integrated tool head 44, through which the electrode 28 and a liner 100 disposed about the electrode 28 extend, may be oscillated to move the electrode 28 and the liner 100 towards and away from the puddle 32. In FIG. 4, a mechanical oscillation system 102 is shown coupled to the integrated tool head 44. The mechanical oscillation system 102 includes a mechanical linkage assembly coupled to the integrated tool head 44. In the illustrated embodiment, the mechanical linkage assembly includes a piston 104 coupled or fixedly attached to the integrated tool head 44 (e.g., via a pin 106), a cam 108 coupled to the piston 104, and a motor 110 configured to drive rotation of the cam 108. In other embodiments, the mechanical linkage assembly and/or the mechanical oscillation system 100 may be directly coupled to the liner 100 to oscillate the liner 100 toward and away from a workpiece. In operation, the mechanical oscillation system 102 periodically lengthens the path that the electrode 28 must travel to the puddle 32 by moving the liner 100 toward and away from the puddle 32 (e.g., a workpiece). In this manner, the mechanical oscillation system 102 may be used to break or remove the electrode 28 (e.g., the liner 100) from the puddle 32 to help form the droplets 22 in a controlled manner. The mechanical oscillation system 102 also may be operated to regulate or control a state of a welding operation. For example, the mechanical oscillation system 102 may operate to enable or improve switching of the welding operation between an arc state and a short state.

As discussed in detail below, the manufacturing tool 20 with the mechanical oscillation system 102 disclosed herein may be operated at substantially fixed frequencies and/or with a limited travel distance of the integrated tool head 44. As a result, the simplicity of the additive manufacturing process may be increased, while significantly reducing costs of the manufacturing tool 20 and the mechanical oscillation system 102. For example, the disclosed mechanical oscillation system 102 enables the formation of the droplets 22 at a low welding current. As will be appreciated, in other embodiments, the mechanical oscillation system 102 may have other components. For example, instead of the motor 110, piston 104, and cam 106, the mechanical oscillation system 102 may be an electro-magnetic system that includes coils, magnets, other mechanical linkage assemblies, and so forth, to enable an oscillating motion of the integrated tool head 44, or other structural component, and therefore the liner 100 coupled to the integrated tool head 44.

As mentioned above, the illustrated mechanical oscillation system 102 (e.g., mechanical linkage assembly) includes the piston 104 coupled or fixedly attached to the integrated tool head 44, the cam 108 coupled to the piston 104, and the motor 110 configured to drive rotation of the cam 108. In certain embodiments, the operation of the motor 110 may be controlled and/or regulated by the controller 42. As the motor 110 drives rotation of the cam 108, the rotation of the cam 108 will actuate the piston 104 up and down, as indicated by arrows 112. Thus, the integrated tool head 44, which may be a bushing, collar, gas nozzle, contact tip, a gas diffuser, an inlet wire guide, or other component fixed to the piston 104, also travels up and down. In this manner, the liner 100 and the electrode 28 are moved towards and away from the puddle 32. As will be appreciated, the travel distance of the integrated tool head 44 may be selected based on a size and/or geometry of the cam 108.

Figure 5:
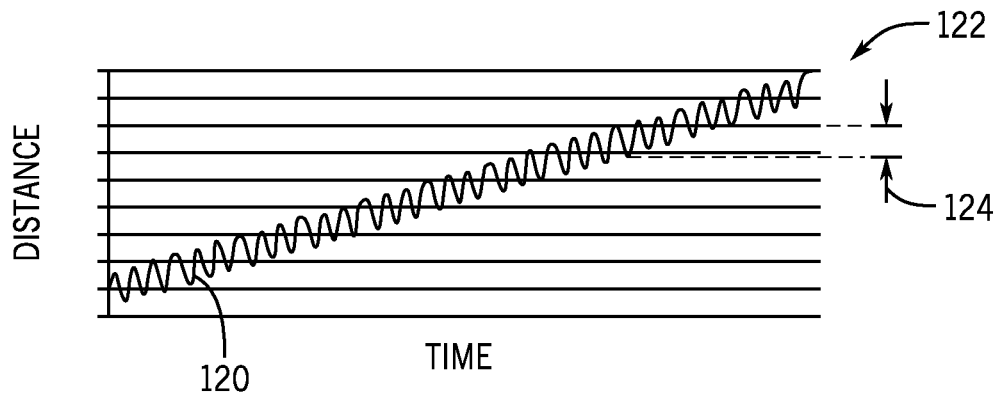
FIG. 5 is a graph illustrating a traveled distance of an electrode with respect to time.

When the integrated tool head 44 oscillates upward, the liner 100 and the electrode 28 are pulled away from the puddle 32, and as the integrated tool head 44 oscillates downward, the liner 100 and the electrode 28 are moved downward toward the puddle 32. Of course, while the mechanical oscillation system 102 is operating and moving the integrated tool head 44 up and down, the electrode 28 is continuously being fed downward toward the puddle 32. Thus, the electrode 28 may have an overall travel distance, which is represented by line 120 in the graph 122 of FIG. 5. As will be appreciated, a peak to peak amplitude 124 of the line 120 may represent the travel distance of the mechanical oscillation system 102 (e.g., the piston 104 and the integrated tool head 44). The gradual increase in overall travel distance of the line 120 may be attributed to the constant feeding of the electrode 28 by the feeder 24.

As mentioned above, the liner 100 is disposed about the electrode 28, and the liner 100 is held and supported by the integrated tool head 44. Thus, when the mechanical oscillation system 102 oscillates the integrated tool head 44, the integrated tool head 44 similarly oscillates the liner 100 directly, but may not directly oscillate the electrode 28. To help facilitate oscillation of the electrode 28 as well, the size of liner 100 may be selected to enable oscillation of the electrode 28 as well.

Figure 6A:
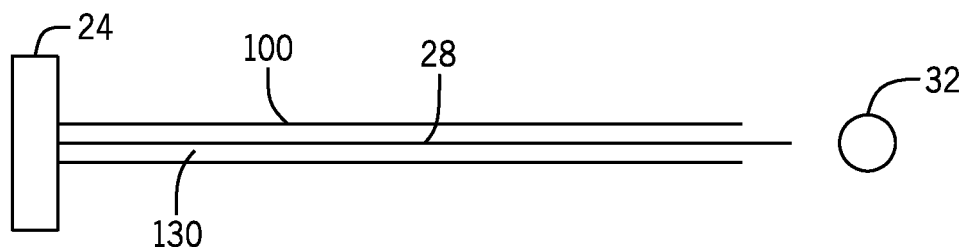
FIG. 6A is a schematic of a liner and an electrode of the additive manufacturing system.
Figure 6B:
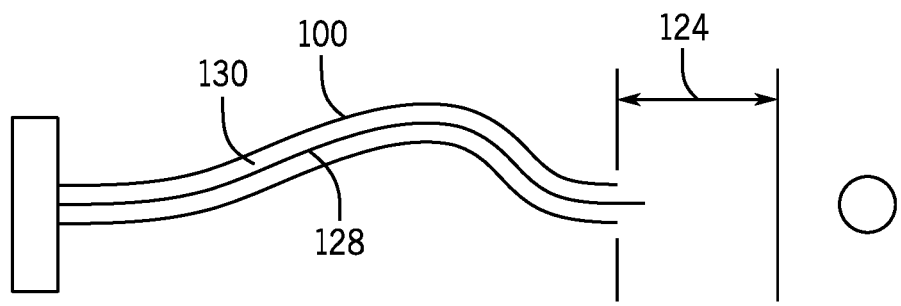
FIG. 6B is a schematic of a liner and an electrode of the additive manufacturing system.

Oscillation of the liner 100 and the electrode 28 is shown schematically in FIGS. 6A and 6B. The integrated tool head 44 and the mechanical oscillation system 102 are not shown. In FIG. 6A, the liner 100 and electrode 28 have not been oscillated upwards by the integrated tool head 44 and the mechanical oscillation system 102. In other words, in FIG. 6A, the liner 100 and electrode 28 are extended fully downward towards the puddle 32. However, in FIG. 6B, the liner 100 and electrode 28 are shown as retracted from the puddle 32 due to oscillation of the mechanical oscillation system 102. In particular, the liner 100 and electrode 28 are retracted the distance 124 (i.e., the peak to peak amplitude shown in FIG. 5). As will be appreciated, a space or gap 130 may exist between the liner 100 and electrode 28, as the liner 100 is a tube or sheath disposed about the electrode 28. This gap 130 may be considered when selecting the size of the cam 108 and/or the sizes and geometries of other components of the mechanical oscillation system 102. Specifically, as the liner 100 is directly retracted by the integrated tool head 44 and the mechanical oscillation system 102, the liner 100 may initially retract without similar retraction of electrode 28 due to the gap 130 between the liner 100 and the electrode 28. Once the liner 100 is directly retracted an initial amount, the liner 100 and the electrode 28 may contact one another and frictionally engage, thereby enabling the retraction of the electrode 28 as well. To ensure the electrode 28 retracts a desired amount (i.e., distance 124), the initial retraction of the liner 100 and the gap 130 between the liner 100 and the electrode 28 may be considered when selecting the sizes and geometries of the components of the mechanical oscillation system 102, such as the cam 108. In certain embodiments, the gap 130 between the liner 100 and electrode 28 may be minimized to improve consistency and accuracy of the oscillating movement of the liner 100 and electrode 28.

The fixed frequency and fixed distance operation of the mechanical oscillation system 102 enables increased simplicity and greatly reduced cost of the additive manufacturing tool 20, and thus may not be greatly customizable. However, customization and modification of the operation of the additive manufacturing tool 20 may be enabled by adjusting, regulating, or otherwise controlling electrical power of the additive manufacturing tool 20. In certain embodiments, the power source 54 may be controlled such that a constant current is applied to the electrode 28. In particular, if the distance 124 that the mechanical oscillation system 102 retracts the electrode 28 from the puddle 32 is sufficiently great, the welding current may remain at a fixed level. The fixed current level may be relatively low, but great enough to melt the electrode 28 and form one droplet 22 at a time. The low constant current may also not cause agitation of the puddle 32.

However, in other embodiments, one or more simple dynamic changes may be applied to the welding current. For example, the controller 42 may regulate operation of the power source 54 to adjust different dynamics of the welding current. For example, dynamic wave shaping may be used, but the changes may be relatively minor to maintain simplicity and low costs. For example, when the liner 100 and electrode 28 are retracted by the mechanical oscillation system 102, the current supplied by the power source 54 may be increased by the controller 42. Increasing the current at this time may help form the next droplet 22, help reduce the possibility of puddle 32 oscillations reattaching to the electrode 28, and/or increase the amount of electrode 28 that can be deposited with the next droplet 22.

As the mechanical oscillation system 102 oscillates the liner 100 and electrode 28 back toward the puddle 32, the current may be reduced (e.g., by the controller 42) as the electrode 28 nears the puddle 32. Reducing the current may help reduce the possibility of the electrode 28 burning away as the electrode 28 tries to contact the puddle 32 and/or reduce the possibility of the electrode 28 and the next droplet 22 contacting the puddle 32 and being "rejected" by the puddle 32. In other embodiments, the current may be maintained at a level substantially lower (e.g., at least 1, 2, 3, 4, 5, 6, 7, 8, 9, or 10 percent) than a peak current level of the system 10 as the liner 100 and electrode 28 are oscillated toward and/or away from the puddle 32.

After the next droplet 22 is formed and as the mechanical oscillation system 102 is about to oscillate away from the puddle 32 again, the current may remain reduced or be reduced further to further reduce puddle 32 agitation. Holding the current low (e.g., substantially lower than a peak current level, as previously described) as the mechanical oscillation system 102 (and the liner 100 and electrode 28) oscillate back away from the puddle 32 also helps leave the newly formed droplet 22 in the puddle 32. More specifically, the current may be held low during a short, and after the short clears, the current may briefly increased to form the droplet 22. The current may also be held low, as discussed above, immediately prior to a state change of a welding operation (e.g., immediately prior to a short or an arc). In certain embodiments, this may be accompanied by a constant voltage. After the droplet 22 is formed, the current is then lowered to reduce agitation of the puddle 32 as the electrode 28 is oscillated away from the puddle 32 again by the mechanical oscillation system 102.

To synchronize operation of the mechanical oscillation system 102 and the power source 54 to achieve the operation described above, the sensors 72 may include position sensors or other types of sensors that detect a location of the integrated tool head 44 at a particular time. For example, the sensors 72 may detect a position of the integrated tool head 44, the piston 106, the cam 108, the liner 100, the electrode 28, or other component. Based on the one or more detected positions, the controller 42 may regulate operation of the power source 54 such that the current output of the power source 54 is a desired level for a particular position of the electrode 28. Other types of sensors may also be used to detect other operating parameters, which may be used to also synchronize operation of the mechanical oscillation system 102 and the power source 54. For example, one or more of the sensors 72 may be used to detect voltage and/or current of the power source 54 and/or the motor 110 (e.g., and therefore detect a state of a welding operation, such as a short or an arc). Other operating parameters may be detected by the sensors 78, such as a phase of operation of the mechanical oscillation system 102, the power source 54, and/or the motor 110, welding arc presence, a short circuit (short circuits per second), angular velocity of the motor 110, wire feed speed, arc length, a clearing event, a shorting event, an arc event, a state change, or other operating parameter of the additive manufacturing system 10.

Figure 7:
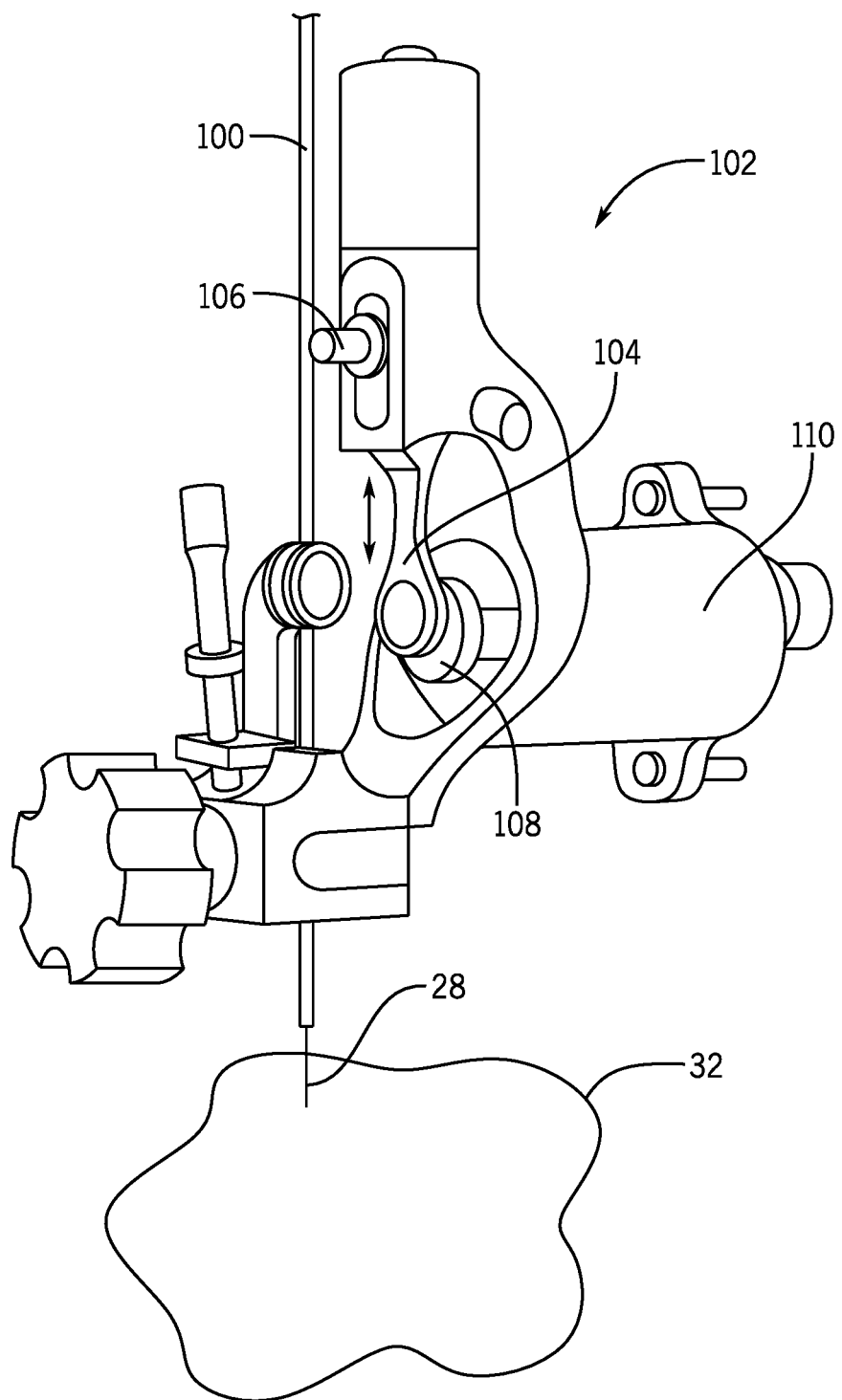
FIG. 7 is a perspective view of the mechanical oscillation system of the additive manufacturing system.

FIG. 7 is a perspective view of an embodiment of the mechanical oscillation system 102, illustrating the mechanical linkage assembly having the piston 104, the cam 108, and the motor 110. As discussed above, the liner 100 may be secured to the piston 104 via the pin 106 or other coupling feature. As the motor 110 drives rotation of the cam 108, the piston 104 is actuated up and down in an oscillating manner, thereby oscillating the liner 110 and electrode 28 up and down. Thus, the electrode 28 is moved toward and away from the puddle 32. In this manner, the mechanical oscillation system 102 enables a simple and cost effective method of operating the additive manufacturing tool 20 (e.g., a welding tool).

In another embodiment, the contact tip is moved along with the liner 100. In this case, the tip has higher friction then the liner and facilitates tighter control. In addition, this motion also inherently changes the distance from the point of current conduction in the tip to the weld. Whereas when the contact tip is in a largely fixed location, the distance between the point of current conduction in the tip to the weld is nearly constant. In either case, the key effect of retracting the wire from the molten weld is accomplished. Similarly, in other embodiments, the liner 100 may be moved along with a gas nozzle, collar, bushing, or other structural component surrounding or coupled to the liner 100.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
an additive manufacturing tool comprising a tool head configured to receive a metallic anchoring material and to supply a plurality of droplets to a part, wherein each droplet of the plurality of droplets comprises the metallic anchoring material, and the tool head is configured such that the metallic anchoring material extends through the tool head;
a liner fixed relative to the tool head, and disposed about the metallic anchoring material;
a mechanical oscillation system configured to mechanically oscillate the tool head of the additive manufacturing tool toward and away from the part at a fixed frequency, wherein the mechanical oscillation of the tool head causes periodic retraction of the metallic anchoring material via retraction of the liner, wherein the mechanical oscillation system causes an initial retraction of the liner without corresponding retraction of the metallic anchoring material due to a gap between the liner and the metallic anchoring material, and causes a retraction of the metallic anchoring material via retraction of the liner past the initial retraction; and
a controller configured to:
independently control the formation and application of each droplet of the plurality of droplets to the part; and
control placement of each of the plurality of droplets such that multiple layers of the droplets are deposited to build up the part to include the multiple layers.

2. The system of claim 1, wherein the mechanical oscillation system comprises:
a motor;
a cam coupled to the motor; and
a piston coupled to the cam, wherein the piston is fixedly attached to the structural component.

3. The system of claim 2, wherein oscillation of the piston has a fixed travel distance.

4. The system of claim 1, comprising a power source configured to supply power to the additive manufacturing tool wherein the controller is configured to regulate operation of the power source based on a position of the structural component detected by at least one sensor.

5. The system of claim 4, wherein the controller is configured to adjust a current level of the power based on the position of the structural component.

6. The system of claim 1, comprising a power source configured to supply a power to the additive manufacturing tool, wherein the power source is a current-regulated power source.

7. The system of claim 1, wherein the additive manufacturing tool comprises a welding torch and the metallic anchoring material comprises a welding wire, the welding torch is configured to apply a power output to the welding wire to supply the plurality of droplets to the part.

8. The system of claim 1, wherein the tool head of the additive manufacturing tool comprises a mixer configured to receive and combine multiple anchor materials, including the metallic anchoring material, into an electrode having a combination of the multiple anchor materials.

9. The system of claim 1, wherein the controller is configured to control the placement of the plurality of droplets such that at least a portion of the droplets are deposited as a second layer onto a first layer that was deposited prior to the second layer.

10. The system of claim 1, wherein the controller is configured to control the placement of the plurality of droplets to form the multiple layers based on a three-dimensional model of the part.

11. A system, comprising:
an additive manufacturing tool comprising a tool head configured to receive a metallic anchoring material and to supply a plurality of droplets to a part, wherein each droplet of the plurality of droplets comprises the metallic anchoring material, and the tool head is configured such that the metallic anchoring material extends through the tool head;
a liner fixed relative to the tool head, and disposed about the metallic anchoring material;
a mechanical oscillation system configured to mechanically oscillate the tool head of the additive manufacturing tool toward and away from the part to deposit the plurality of droplets on the part via short circuit, wherein the mechanical oscillation of the tool head causes retraction of the metallic anchoring material via retraction of the liner, wherein the mechanical oscillation system causes an initial retraction of the liner without corresponding retraction of the metallic anchoring material due to a gap between the liner and the metallic anchoring material, and causes a retraction of the metallic anchoring material via retraction of the liner past the initial retraction; and
a controller configured to:
independently control the formation and application of each droplet of the plurality of droplets to the part; and
control placement of each of the plurality of droplets such that multiple layers of the droplets are deposited to build up the part to include the multiple layers.

12. The system of claim 11, wherein the controller is configured to control the placement of the plurality of droplets such that at least a portion of the droplets are deposited as a second layer onto a first layer that was deposited prior to the second layer.

13. The system of claim 11, wherein the controller is configured to control the placement of the plurality of droplets to form the multiple layers based on a three-dimensional model of the part.

\* \* \* \* \*